United States Patent [19]

Diana

[11] 3,919,202

[45] Nov. 11, 1975

[54] 3-(SUBSTITUTED AMINO)-1H-ISOINDOLES

[75] Inventor: Guy D. Diana, Stephentown, N.Y.

[73] Assignee: Sterling Drug Inc., New York, N.Y.

[22] Filed: Feb. 25, 1974

[21] Appl. No.: 445,645

Related U.S. Application Data

[60] Division of Ser. No. 277,152, Aug. 2, 1972, Pat. No. 3,839,356, which is a continuation-in-part of Ser. No. 62,701, Aug. 10, 1970, Pat. No. 3,723,421.

[30] Foreign Application Priority Data

Aug. 6, 1971 Canada ............................ 120031

[52] U.S. Cl. ......... 260/240 F; 260/240 G; 260/325; 260/326.1; 260/566 A; 424/274

[51] Int. Cl.² ........................... C07D 209/44

[58] Field of Search ......... 260/240 G, 326.1, 240 F

[56] References Cited

UNITED STATES PATENTS 3,345,355  10/1967  Raue ..................... 260/240 G
3,723,421  3/1973  Diana .................... 260/326.1
3,753,994  8/1973  Diana .................... 260/240 G

OTHER PUBLICATIONS

Eberle et al., Chem. Abstracts, 73 (1970) No. 77177.

*Primary Examiner*—Arthur P. Demers
*Attorney, Agent, or Firm*—Theodore C. Miller; B. Woodrow Wyatt

[57] ABSTRACT

3-(Substituted or unsubstituted amino)-1H-isoindoles, prepared by condensing 3-alkoxy-1H-isoindoles or 3-(chloro or bromo)-1H-isoindoles with amine derivatives and optionally acylating the resulting 3-(primary or secondary amino)-1H-isoindoles or condensing the resulting 3-hydrazino-1H-isoindoles with an aldehyde or a ketone, are useful as antibacterial agents, as antihypertensive agents and/or as antiinflammatory agents.

9 Claims, No Drawings

3-(SUBSTITUTED AMINO)-1H-ISOINDOLES

This application is a division of my prior copending application Ser. No. 277,152, filed Aug. 2, 1972, now Pat. No. 3,839,356, which is in turn a continuation-in-part of my prior copending application Ser. No. 62,701, filed Aug. 10, 1970, now U.S. Pat. 3,723,421.

This invention relates to new and useful compositions of matter classified in the art of chemistry as isoindoles and to processes for their preparation.

In one of its composition of matter aspects my invention provides 1-(X)-1-(X')-3-(Y)-5-(Z)-6-(Z')-1H-isoindole of the formula

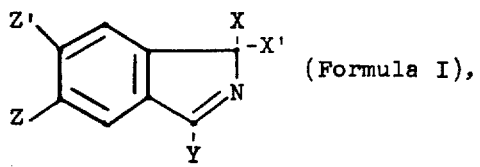

(Formula I), wherein X, when taken alone, is hydrogen, atertiary alkyl or one to four carbon atoms, phenyl, or phenylalkyl of seven to ten carbon atoms;
X', when taken alone, is hydrogen;
Y is NQQ' or NHN=CRR';
wherein:
Q, when taken alone, is phenylalkyl of seven to ten carbon atoms; $(CH_2)_n$-T, wherein $n$ is two or three and T is dialkylamino, wherein alkyl of dialkylamino is atertiary alkyl of one to four carbon atoms; amino or hydroxy;
Q', when taken alone, is hydrogen or atertiary alkyl of one to four carbon atoms;
Q and Q', when taken together with N, are 1-azacycloalkyl of five to seven ring atoms and four to ten carbon atoms;
R, when taken alone, is hydrogen, alkyl of one to six carbon atoms, alkenyl of two to six carbon atoms, cycloalkyl of three to seven ring atoms and three to ten carbon atoms, cycloalkenyl of five to seven ring atoms and five to ten carbon atoms, phenyl, phenylalkyl of seven to ten carbon atoms or phenylalkenyl of eight to twelve carbon atoms;
R', when taken alone, is hydrogen or atertiary alkyl of one to four carbon atoms;
R and R', when taken together with C, are cycloalkylidene of five to seven ring atoms and five to ten carbon atoms;
Z and Z', when taken alone, are the same or different and are hydrogen, atertiary alkyl of one to four carbon atoms, halo, hydroxy or atertiary alkoxy of one to four carbon atoms;
Z and Z', when taken together, are methylenedioxy; and wherein,
when Q is phenylalkyl or when R is phenyl, phenylalkyl or phenylalkenyl, the benzene ring thereof can be substituted by one to three members selected from the group consisting of halo, hydroxy, atertiary alkyl of one to four carbon atoms, atertiary alkoxy of one to four carbon atoms and phenylalkoxy of seven to ten carbon atoms or by a member selected from the group consisting of atertiary alkylthio of one to four carbon atoms, dialkylamino and β-dialkylaminoethoxy, wherein alkyl or dialkylamino is atertiary alkyl of one to four carbon atoms, nitro and sulfamoyl;
and acid addition salts thereof.

In its other composition of matter aspect my invention provides 1-(X)-1-(X')-3-(Y)-5-(Z)-6-(Z')-1H-isoindole of Formula I wherein X and X', when taken together, are benzylidene, α-chlorobenzylidene, or α-bromobenzylidene;
Y is NQ"Q' or NHN=CRR';
wherein Q", when taken alone is hydrogen; alkyl of one to six carbon atoms; phenylalkyl of seven to ten carbon atoms; $(CH_2)_n$-T, wherein $n$ is two or three and T is dialkylamino, wherein alkyl of dialkylamino is atertiary alkyl of one to four carbon atoms; amino or hydroxy;
Q', when taken alone, is hydrogen or atertiary alkyl of one to four carbon atoms;
Q" and Q', when taken together with N, are 1-azacycloalkyl of five to seven ring atoms and four to ten carbon atoms;
R, when taken alone, is hydrogen, alkyl of one to six carbon atoms, alkenyl of two to six carbon atoms, cycloalkyl of three to seven ring atoms and three to ten carbon atoms, cycloalkenyl of five to seven ring atoms and five to ten carbon atoms, phenyl, phenylalkyl of seven to ten carbon atoms or phenylalkenyl of eight to twelve carbon atoms;
R', when taken alone, is hydrogen or atertiary alkyl of one to four carbon atoms;
R and R', when taken together with C, are cycloalkylidene of five to seven ring atoms and five to ten carbon atoms;
Z and Z', when taken alone, are the same or different and are hydrogen, atertiary alkyl of one to four carbon atoms, halo, hydroxy or atertiary alkoxy of one to four carbon atoms;
Z and Z', when together, are methylenedioxy; and wherein, when
Q" is phenylalkyl or when R is phenyl, phenylalkyl or phenylalkenyl, the benzene ring thereof can be substituted by one to three members selected from the group consisting of halo, hydroxy, atertiary alkyl of one to four carbon atoms, atertiary alkoxy of one to four carbon atoms and phenylalkoxy of seven to ten carbon atoms or by a member selected from the group consisting of atertiary alkylthio of one to four carbon atoms, dialkylamino and β-dialkylaminoethoxy, wherein alkyl of dialkylamino is atertiary alkyl of one to four carbon atoms, nitro and sulfamoyl;
and acid addition salts thereof.

The isoindoles of Formula I and acid addition salts thereof have antibacterial activity, antihypertensive activity and/or antiinflammatory activity and are useful as antibacterial agents, as antihypertensive agents and/or as antiinflammatory agents.

In the first of its process aspects my invention provides the process for producing 1-(X")-1-(X')-3-(Y)-5-(Z)-6-(Z')-1H-isoindole of the formula

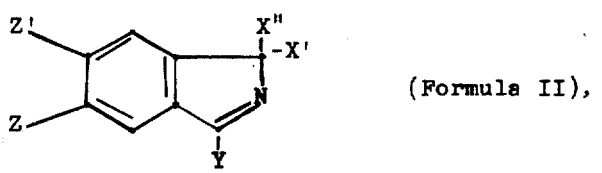

(Formula II), wherein
X'', when taken alone, is hydrogen, a tertiary alkyl of one to four carbon atoms, phenyl, or phenylalkyl of seven to ten carbon atoms;
X', when taken alone, is hydrogen as recited above for Formula I;
Y is NQQ';
wherein Q, when taken alone, is phenylalkyl of seven to ten carbon atoms unsubstituted or substituted in the benzene ring as recited above for Formula I; $(CH_2)_n$-T, wherein $n$ is two or three and T is dialkylamino, wherein alkyl of dialkylamino is a tertiary alkyl of one to four carbon atoms; amino or hydroxy as recited above for Formula I;
Q', when taken alone, is hydrogen or a tertiary alkyl of one to four carbon atoms as recited above for Formula I;
Q and Q', when taken together with N, are 1-azacycloalkyl of five to seven ring atoms and four to ten carbon atoms as recited above for Formula I;
Z and Z' are defined as recited above for Formula I; which comprises the step of condensing 1-(X'')-1-(X')-3-(OQ''')-5-(Z)-6-(Z')-1H-isoindole of the formula

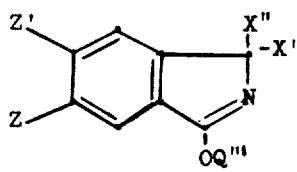

(Formula III), wherein
Q''' is methyl, ethyl or propyl, with an amine, a hydrazine or a hydroxylamine of the formula HNQQ' or an acid addition salt thereof.

In the second of its process aspects my invention provides the process for producing 1-(X'')-1-(X')-3-(Y)-5-(Z)-6-(Z')-1H-isoindole of Formula II wherein:
X'' and X', when taken together, are benzylidene;
Y is NQ''Q';
wherein
Q'', when taken alone, is hydrogen, alkyl of one to six carbon atoms; phenylalkyl of seven to ten carbon atoms unsubstituted or substituted in the benzene ring as recited above in Formula I; $(CH_2)_n$-T, wherein n is two or three and T is dialkylamino, wherein alkyl of dialkylamino is a tertiary alkyl of one to four carbon atoms; amino or hydroxy as recited above for Formula I;
Q', when taken alone, is hydrogen or a tertiary alkyl of one to four carbon atoms as recited above for Formula I;
Q'' and Q', when taken together with N, are 1-azacycloalkyl of five to seven ring atoms and four to ten carbon atoms;
Z and Z' are defined as recited above for Formula I; which comprises the step of condensing 1-(X'')-1-(X')-3-(OQ''')-5-(Z)-6-(Z')-1H-isoindole of the formula

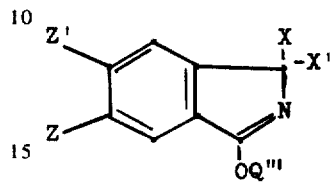

(Formula III), wherein:
Q''' is methyl, ethyl or propyl, with an amine, a hydrazine or a hydroxylamine of the formula HNQ'λ'Q' or an acid addition salt thereof.

In the third of its process aspects my invention provides the process for producing 1-(X''',X'''')-methylene)-3-(NQ''Q')-5-(Z)-6-(Z')-1H-isoindole of the formula

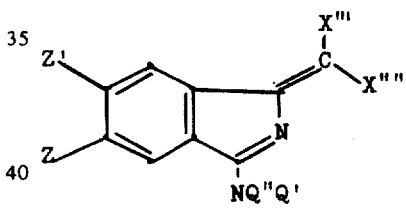

(Formula IV), wherein:
X''' is phenyl
X'''' is chloro or bromo;
Q'' and Q' are defined as recited above for Formula I;
Z and Z' are defined as recited above for Formula I; which comprises the steps of chlorinating or brominating 3-(X'''-methylene)-5-(Z)-6-(Z')-phthalimidine of the formula

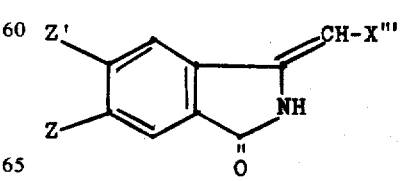

(Formula V), and condensing the resulting 1-(X''',X''''-methylene)-3-(X''''')-5-(Z)-6-(Z')-1H-isoindole of the formula

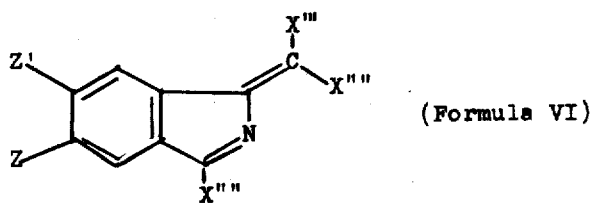

(Formula VI)

with an amine, a hydrazine or a hydroxylamine of the formula HNQ''Q'.

In the fourth of its process aspects my invention provides the process for producing 1-(X)-1-(X')-3-(NHN=CRR')-5-(Z)-6-(Z')-1H-isoindole of the formula

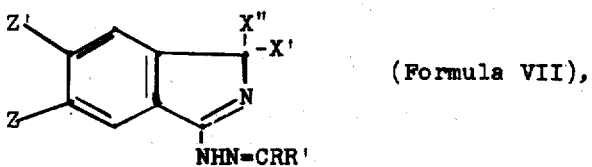

(Formula VII), wherein X'', X', R, R', Z and Z' are defined as recited above for Formulas I and II, which comprises the step of condensing 1-(X)-1-(X')-5-(Z)-6-(Z')-3-hydrazino-1H-isoindole of the formula

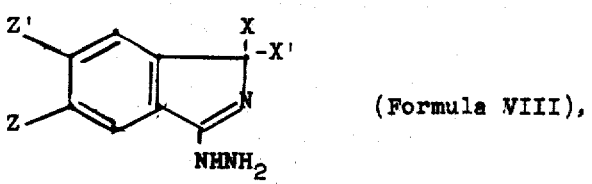

(Formula VIII), or an acid addition salt thereof with an aldehyde or a ketone of the formula O=CRR'.

Throughout this specification a symbol used in one formula has the same meaning when used in any other formula.

In the definitions of the formulas above a tertiary alkyl of one to four carbon atoms is methyl, ethyl, propyl, isopropyl, butyl, isobutyl or sec-butyl. A tertiary alkoxy of one to four carbon atoms is methoxy, ethoxy, propoxy, isopropoxy, butoxy, isobutoxy or sec-butoxy. A tertiary alkylthio of one to four carbon atoms is methylthio, ethylthio, propylthio, isopropylthio, butylthio, isobutylthio or sec-butylthio.

When X, X'', Q, Q'' or R is phenylalkyl of seven to ten carbon atoms, phenylalkyl is, for example, benzyl, 1-phenylethyl, 3-phenylpropyl or 1-methyl-1-phenylethyl.

When Q'' or R is alkyl of one to six carbon atoms, alkyl can be branched or unbranched alkyl, as illustrated by methyl, ethyl, propyl, isopropyl, butyl, isobutyl, sec-butyl, tert-butyl, pentyl and hexyl.

When Q and Q', or Q'' and Q' taken together with N, are 1-azacycloalkyl of five to seven ring atoms and four to ten carbon atoms, 1-azacycloalkyl can be branched or unbranched 1-azacycloalkyl, as illustrated by 1-pyrrolidinyl, piperidino, 4-methyl-1-piperidinyl and 1-hexahydroazepinyl.

When R is alkenyl of two to six carbon atoms, alkenyl can be branched or unbranched alkenyl, as illustrated by vinyl, allyl, 1-methyl-1-propenyl and 2-hexenyl.

When R is cycloalkyl of three to seven ring atoms and three to ten carbon atoms, cycloalkyl can be branched or unbranched cycloalkyl, as illustrated by cyclopropyl, cyclobutyl, cyclopentyl, cyclohexyl, 4-methylcyclohexyl and cycloheptyl.

When R is cycloalkenyl of five to seven ring atoms and five to ten carbon atoms, cycloalkenyl can be branched or unbranched cycloalkenyl, as illustrated by 1-cyclopentenyl, 3-cyclohexenyl, 4-methyl-3-cyclohexenyl and 1-cycloheptenyl.

When R is phenylalkenyl of eight to twelve carbon atoms, phenylalkenyl is, for example, styryl, α-methylstyryl or β-methylstyryl.

When R and R', taken together with C, are cycloalkylidene of five to seven ring atoms and five to ten carbon atoms, cycloalkylidene can be branched or unbranched cycloalkylidene, as illustrated by cyclopentylidene, cyclohexylidene, 4-methylcyclohexylidene and cycloheptylidene.

As benzene ring substituents halo is fluoro, chloro, bromo or iodo and phenylalkoxy is illustrated by benzyloxy, β-phenylethoxy and β-phenylpropoxy.

The manner and process of making and using the invention and the best mode of carrying it out will now be described so as to enable any person skilled in the art to which it pertains to make and use it.

Condensation of 1-(X'')-1-(X')-3-(OQ''')-5-(Z)-6-(Z')-1H-isoindole of Formula III with an amine, a hydrazine or a hydroxylamine of the formula HNQQ' or HNQ''Q' or an acid addition salt thereof is performed with or without a diluent at a temperature in the range of 0°–150°C. If a diluent is used, it can be any solvent inert under the reaction conditions, for example, methanol, ethanol, 2-propanol, acetonitrile, dimethylsulfoxide, N,N-dimethylformamide or mixtures thereof.

Chlorination or bromination of 1-(X'''-methylene)-5-(Z)-6-(Z')-phthalimidine of Formula V is accomplished using a chlorinating or brominating agent, preferably thionyl chloride or thionyl bromide, with or without a diluent at a temperature in the range of 0°–150°C. If a diluent is used, it can be any solvent inert under the reaction conditions, for example, chloroform, benzene or chlorobenzene.

Condensation of 1-(X''', X''''-methylene)-3-(X''''')-5-(Z)-6-(Z')-1H-isoindole of Formula VI with an amine, a hydrazine or a hydroxylamine of the formula HNQ''Q' is carried out using a solvent inert under the reaction conditions at a temperature in the range of 0°–150°C. Ether is the preferred solvent, although tetrahydrofuran, chloroform, benzene or dioxane or mixtures thereof can also be used.

Condensation of 1-(X)-1-(X')5-(Z)-6-(Z')-3-hydrazino-1H-isoindole of Formula VIII or an acid addition salt thereof with an aldehyde or a ketone of the formula O=CRR' is effected with or without a diluent at a temperature in the range of 0°–150°C. If a diluent is used it can be any solvent inert under the reaction conditions, for example, methanol, ethanol, ether, benzene, tetrahydrofuran or mixtures thereof.

Acid addition salts of the isoindoles of Formula I of my invention can be prepared with any pharmaceutically acceptable inorganic (mineral) or organic acid. If inorganic, the acid can be, for example, hydrochloric acid, hydrobromic acid, nitric acid, phosphoric acid, sulfuric acid, or sulfamic acid. If organic, the acid can be, for example, acetic acid, glycolic acid, lactic acid, quinic acid, hydrocinnamic acid, succinic acid, tartaric acid, citric acid, methanesulfonic acid, benzenesulfonic acid, cyclohexanesulfamic acid or picric acid.

For the pharmaceutical purposes of this invention the free base forms of the isoindoles of Formula I and their corresponding acid addition salts are considered to be equivalent. That the protonic acid be pharmaceutically acceptable means that the beneficial properties inherent in the free base not be vitiated by side effects ascribable to the anions.

Although pharmaceutically acceptable salts are preferred, all acid addition salts are within the scope of the invention. A pharmaceutically unacceptable salt may be useful, for example, for purposes of identification or purification or in preparing a pharmaceutically acceptable salt by ion exchange procedures.

When crystalline, the isoindoles of Formulas I–VIII and their acid addition salts are purified by recrystallization and are characterized by their melting points (m.p.). When liquid, the isoindoles of Formulas I–VIII are purified by distillation under reduced pressure and are characterized by their boiling points (b.p./mm.Hg.). The structures of the isoindoles of Formula I follow from the route of synthesis and are corroborated by infrared spectral analysis, by nuclear magnetic resonance spectral analysis and by the correspondence of calculated and found values of elemental analysis of representative samples.

As stated above isoindoles of Formula I have antibacterial activity. This activity was measured by two test methods.

The first method is the spot plate test, which involves placing a few crystals of the compound to be tested on a seeded agar plate, incubating the plate and examining the plate for zones of inhibition of bacterial growth. A compound producing a zone of inhibition is recorded as active and a compound producing no zone of inhibition as inactive.

The second method is the broth dilution test by the Autotiter method. To the first cup of the Autotray is added an aliquot (0.08 ml.) of an aqueous solution (1000 mcg./ml.) of the compound to be tested. Activation of the Autotiter initiates a sequence of operations in which an aliquot (0.05 ml.) of the solution in the first cup is withdrawn by a Microtiter transfer loop and diluted in sterile tryptose phosphate broth (0.05 ml.) in the second cup. Inoculated tryptose phosphate broth (0.05 ml.) containing triphenyltetrazolium chloride (50 mcg./ml.) as an indicator is then automatically added. After the initial dilution, the dilutions continue in twofold decrements (from 250 to 0.06 mcg./ml.). The Autotray is incubated (18–20 hr. at 37°C.) and the minimum inhibitory concentration determined as the concentration which inhibits formation of a red precipitate of the indicator. The isoindoles of Formula I had minimum inhibitory concentrations in the range of 15–250 micrograms per milliliter in this test.

In a modification of the foregoing broth dilution test the initial aliquot is different (0.1 mcg./ml. instead of 0.08 mcg./ml.), the broth contains glucose instead of tryptose phosphate, no indicator is used, the dilution range is different (from 500 to 0.06 mcg./ml. instead of 250 to 0.06 mcg./ml.) and inhibition is judged by turbidity instead of by the appearance of a red precipitate.

The organisms used in the two broth dilution tests were *Staphylococcus aureus*, *Pseudomonas aeruginosa*, *Escherichia coli* and *Proteus vulgaris*.

As stated above isoindoles of Formula I also have antihypertensive activity, which was tested by two methods.

In the first method the renal hypertensive rat is used. The compound to be tested is administered, preferably in the form of a pharmaceutically acceptable acid addition salt, orally as a gum tragacanth suspension or subcutaneously as an aqueous solution to three renal hypertensive rats at each of four different dose levels graduated at 0.3 to 0.9 logarithmic intervals. The systolic blood pressure is determined for each of the three rats at each dose level before medication and at intervals of 1, 2, 4, 5, 24 and 48 hours after medication. The unmedicated rats are considered hypertensive if the systolic blood pressure is 160 millimeters of mercury or greater. The medicated rats are considered normotensive if the systolic blood pressure is 130 millimeters of mercury or less. Each blood pressure reading is judged by these criteria. The dose level of test compound which reduces the systolic blood pressure to a normotensive level in 50% of the animals is defined as the $AED_{50}$ (approximate effective dose) value. When tested in this way, isoindoles of Formula I were found to have $AED_{50}$ values in the range of 5–50 milligrams per kilogram.

In the second method for testing antihypertensive activity the renal hypertensive rat or the spontaneous hypertensive [Okamoto and Ooki, Japan Circulation J., 27, 282(1963)] rat is used. The compound to be tested is administered, preferably in the form of a pharmaceutically acceptable acid addition salt, orally as a gum tragacanth suspension or subcutaneously as an aqueous solution at one or more dose levels to five hypertensive rats at each dose level. The systolic blood pressure of each rat is determined before medication and at 2, 6 and 24 hours after medication. Of the values of the systolic blood pressure of each rat determined at 2, 6 and 24 hours which are lower than the premedication value, the lowest value is chosen. The difference between the premedication value and the lowest value is the maximum lowering of the systolic blood pressure and the maximum lowerings are averaged for each group of rats. When the data permit, at least three such average maximum lowerings are plotted to determine the $AHD_{40}$ (antihypertensive dose) value, that is, the dose which would effect an average maximum lowering of 40 millimeters of mercury.

As further stated above isoindoles of Formula I have antiinflammatory activity. This activity was measured by two test methods.

The first method is the carrageenin edema method and is essentially that of VanArman, Begany, Miller and Pless, *Journal of Pharmacology and Experimental Therapeutics* 150, 328(1965) as modified by Winter, Risley and Nuss, *Proceedings of the Society for Experimental Biology and Medicine* 111, 544(1962). Young male rats weighing 100–110 grams are used. Food is withdrawn approximately 18 hours prior to medication, but the animals are permitted free access to drinking water up to the time of medication. Compounds to be tested are suspended by triturating in 1% gum tragacanth and administered by gavage in a volume of 1 milliliter per 100 grams of body weight. Control animals receive the gum tragacanth only. One hour after medication, 0.05 milliliter of a 1% suspension of carrageenin in 0.9% saline is injected into the plantar tissue of the left hind paw. Three hours after injection of the carrageenin, edema formation, that is, increase in foot volume (difference between left hind paw and the uninjected right hind paw) is measured plethysmographically in the unanesthetized rat. The extended paw is immersed to the top of the most proximal callus pad into a mercury-filled glass cylinder connected to a pressure transducer and the impulse amplified and recorded by a polygraph. The polygraph is standardized for each assay so that a deflection of 3.6 millimeters on the recording paper is equivalent to a volume of 0.1 milliliter. The results are expressed as percent inhibition calculated from the average differences in foot volume between the control and medicated rats. A compound is judged to be active if the differences in edema formation between medicated and control rats are statistically significant at the 5% level of probability. Isoindoles of Formula I were found to be active in this test at doses in the range of 50–300 milligrams per kilogram.

The second method is the adjuvant induced arthritis method and is a modification of the methods of Pearson, *Journal of Chronic Diseases* 16, 863(1963) and Glenn and Gray, *American Journal of Veterinary Research* 26, 1180(1965). Adult male rats weighing 200-230 grams are used. Adjuvant (*M. butyricum*, 0.1 milliliter of a 0.6% suspension in heavy mineral oil) is injected into the plantar tissue of the left hind paw. A negative control group is injected with mineral oil only. Beginning on the ninth day after adjuvant injection (polyarthritis does not appear until approximately the tenth day after adjuvant administration), the animals receive 6 daily medications of test compound suspended in 1% gum tragacanth and administered by gavage in a volume of 1 milliliter per 100 grams of body weight. Both the negative control and adjuvant injected control animals receive the vehicle only. Food and water are permitted ad libitum. Twenty-four hours after the last medication, the animals are weighed, the degree of arthritic involvement, that is, increase in foot volume (difference between adjuvant injected left hind paw and uninjected right hind paw) and plasma inflammation units are determined. Foot volume is measured plethysmographically in the unanesthetized rat. The extended paw is immersed to the top of the most proximal callus pad into a mercury-filled glass cylinder connected to a pressure tranducer and the impulse amplified and recorded by a polygraph. The polygraph is standardized for each assay so that a deflection of 3.6 millimeters on the recording paper is equivalent to a volume of 0.1 milliliter. The results are expressed as percent inhibition calculated from the average differences in foot volume between the adjuvant injected control and medicated rats correcting for difference in foot volume of the oil injected negative control group. Following foot volume measurements, the animals are etherized and bled by heart puncture into rubber stoppered evacuated glass tubes (calibrated to draw 2.7 milliliters) containing 0.3 milliliter of 0.1 M sodium oxalate solution for determination of plasma inflammation units. The unclotted blood is centrifuged and 0.1 milliliter of the plasma is diluted with 5.0 milliliter of 0.9% sodium chloride solution. The plasma inflammation units are direct spectrophotometer optical density readings expressed as the difference between preheated and heated (30 minutes at 56°C.) plasma, corrected for 1:50 dilution. The results are expressed as percent inhibition calculated from the difference between the average plasma inflammation units of oil injected negative control rats. A compound is judged to be active if the differences between medicated and adjuvant injected controls are statistically significant at the 5% level of probability. Isoindoles of Formula I were found to be active in this test at doses in the range of 50–300 milligrams per kilogram.

The preparation of the intermediates of Formulas III and V will now be described.

Alkylation of 3-(X'')-3-(X')-5-(Z')-6-(Z)-phthalimidine of the formula

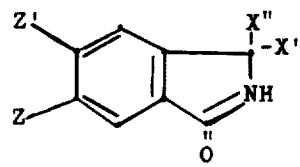

(Formula IX)

with a $(Q''')_3O^+$(trialkyloxonium) salt provides 1-(X'λ')-1-(X')-3-(OQ''')-5-(Z)-6-(Z')-1H-isoindole of Formula III. The preferred trialkyloxonium salt is triethyloxonium fluoborate $[(C_2H_5)_3O^+BF_4^-]$.

Those phthalimidines of Formula IX in which X'' and X' are hydrogen are prepared, for example, by zinc and acetic acid reduction of the corresponding phthalimides.

Those phthalimidines of Formula IX in which X'' is alkyl, phenyl or phenylalkyl are prepared, for example, from the corresponding 3-(Z')-4-(Z)-phenyl-(X'')-ketoximes of the formula

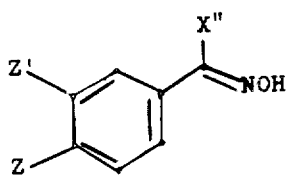

(Formula X)

by treatment with carbon monoxide and hydrogen under pressure and catalysis by cobalt octacarbonyl. Those phthalimidines of Formula IX in which X'' is benzyl are also prepared by catalytic hydrogenation of the corresponding phthalimidines of Formula IX in which X'' and X', taken together, are benzylidene.

Those phthalimidines of Formula IX in which X'' and X', taken together, are benzylidene are the phthalimidines defined by Formula V and are prepared, for example, by condensing phthalic anhydride with the corresponding α-(X''')-acetic acids under sodium acetate catalysis and treating the resulting 3-(X'''-methylene)-5-(Z')-6-(Z)-phthalides successively with sodium hydroxide, hydrochloric acid and ammonia.

The following examples illustrate specific embodiments of my invention without limiting the latter thereto.

EXAMPLE 1

A mixture of 3-ethoxy-1H-isoindole (III: X'' = X' = Z = Z' = H, Q''' = $C_2H_5$) fluoborate (17.5 g.), β-(dimethylamino)-ethylamine (25 ml.) and methylene dichloride was stirred at room temperature (for 3 da.), allowed to stand in the refrigerator (for 1 wk.), basified with cooling with potassium carbonate solution (50%, 30 ml.), dried over magnesium sulfate and filtered. The filtrate was concentrated. A mixture of the resulting oil and ether (300 ml.) was acidified with ethereal hydrochloric acid. Two recrystallizations of the resulting solid from isopropyl alcohol afforded 3-{[2-(dimethylamino)-ethyl]amino}-1H-isoindole (I:X = X'= Z = Z' = H, Y = NQQ', Q = $CH_2CH_2N(CH_3)_2$, Q' = H) dihydrochloride (4.5 g., m.p. 258°–260°C. with decomposition).

EXAMPLE 2

Condensation of 1-methyl-3-ethoxy-1H-isoindole (III: X'' = $CH_3$, X' = Z = Z' = H, Q''' = $C_2H_5$) and β-(dimethylamino)ethylamine affords 1-methyl-3-{[2-(dimethylamino)ethyl]-amino-{1H-isoindole (I: X = $CH_3$, X' = Z = Z' = H, Y = NQQ', Q = $CH_2CH_2N(CH_3)_2$, Q' = H).

EXAMPLE 3

Condensation of 1-ethyl-3-ethoxy-1H-isoindole (III: X'' = Q''' = $C_2H_5$, X'= Z = Z' = H) and β-(dimethylamino)ethylamine affords 1-ethyl-3-{[2-(dimethylamino)ethyl]amino}-1H-isoindole (I:X= $C_2H_5$, X' = Z = Z' = H, Y = NQQ', Q = $CH_2CH_2N(CH_3)_2$, Q' = H).

EXAMPLE 4

Condensation of 1-isopropyl-3-ethoxy-1H-isoindole (III: X'' = $CH(CH_3)_2$, X' = Z = Z' = H, Q''' = $C_2H_5$) and β-(dimethylamino)ethylamine affords 1-isopropyl-3-{[2-(dimethylamino)ethyl]amino}-1H-isoindole (I:X = $CH(CH_3)_2$, X' = Z = Z' = H, Y = NQQ', Q = $CH_2CH_2N(CH_3)_2$, Q' = H).

EXAMPLE 5

Condensation of 1-butyl-3-ethoxy-1H-isoindole (III: X'' = $(CH_2)_3CH_3$, X' = Z = Z' = H, Q''' = $C_2H_5$) and β-(dimethylamino)-ethylamine affords 1-butyl-3-{[2-(dimethylamino)ethyl]amino}-1H-isoindole (I: X = $(CH_2)_3CH_3$, X' = Z = Z' = H, Y = NQQ', Q = $CH_2CH_2N(CH_3)_2$, Q' = H).

EXAMPLE 6

A mixture of 1-phenyl-3-ethoxy-1H-isoindole (III: X'' = $C_6H_5$, X' = Z = Z' = H, Q''' = $C_2H_5$) (14 g., m.p. 118°–120°C.) and β-(dimethylamino)ethylamine (20 ml.) was heated under reflux (for 12 hr.). Part (11.5 g.) of the crystalline solid (14.3 g.) which separated after cooling the mixture was dissolved in absolute ethanol (140 ml.) and treated with a solution of cyclohexanesulfamic acid (23.2 g.) in absolute ethanol (90 ml.). The resulting solid was recrystallized from isopropyl alcohol-ether, affording 1-phenyl-3-{[2-(dimethylamino)ethyl]amino}-H-isoindole (I:X = $C_6H_5$, X' = Z = Z' = H, Y = NQQ', Q = $CH_2CH_2N-(CH_3)_2$, Q' = H) tris(cyclohexanesulfamate) (8.4 g., m.p. 152°–154°C.).

EXAMPLE 7

In a manner similar to that of Example 6, condensation of 1-benzyl-3-ethoxy-1H-isoindole (III: X'' = $CH_2C_6H_5$, X' = Z = Z' = H, Q''' = $C_2H_5$) (17.3 g.) and β-(dimethylamino)ethylamine and treatment of an ethanol (300 ml.) solution of the resulting gum with picric acid (30 g.) afforded 1-benzyl-3-{[2-(dimethylamino)-ethyl]amino}-1H-isoindole (I:X= $CH_2C_6H_5$, X' = Z = Z' = H, Y = NQQ', Q = $CH_2CH_2N(CH_3)_2$, Q' = H) dipicrate (16.9 g., m.p. 196°–197°C.).

Treatment of 1-benzyl-3-[2-(dimethylamino)ethyl]-amino}-1H-isoindole with cyclohexanesulfamic acid afforded 1-benzyl-3-{[2-(dimethylamino)ethyl]amino}-1H-isoindole tris(cyclohexanesulfamate) (m.p. 146°–148°C.).

EXAMPLE 8

Condensation of 1-(1-phenylethyl)-3-ethoxy-1H-isoindole (III: X'' = $CH(CH_3)C_6H_5$, X' = Z = Z' = H, Q''' = $C_2H_5$) and β-(dimethylamino)ethylamine affords 1-(1-phenylethyl)-3-{[2-(dimethylamino) ethyl]amino}-1H-isoindole (I:X= $CH(CH_3)C_6H_5$, X' = Z = Z' = H, Y = NQQ', Q = $CH_2CH_2N(CH_3)_2$, Q' = H).

EXAMPLE 9

In a manner similar to that of Example 1 condensation of 1-benzylidene-3-ethoxy-1H-isoindole (III: X'λ '+X' = $CHC_6H_5$, Q = $C_2H_5$, Z = Z' = H) (24.9 g., m.p. 102°–105°C.) and β-(dimethylamino)ethylamine (40 ml.) and treatment of the resulting product with hydrochloric acid afforded 1-benzylidene-3-{[2-(dimethylamino)ethyl]amino}-1H-isoindole (I: X+X' = $CHC_6H_5$, Y = NQQ', Q = $CH_2CH_2N(CH_3)_2$, Q' = H, Z = Z' = H) dihydrochloride (16.0 g., m.p. 240°–241°C.).

EXAMPLE 10

A. A mixture of 2-benzylidenephthalimidine (V: X''' = $C_6H_5$, Z = Z' = H) (72 g.) and thionyl chloride (300 ml.) was heated under reflux (for 2 da.), then stripped of excess thionyl chloride. The residue was digested with Skellysolve A (82.6 g., m.p. 122°–123°C.). Part (35 g.) of the digested residue was recrystallized from Skellysolve B and part (1 g.) of the recrystallizate was again recrystallized from Skellysolve B, affording 1-($\alpha$-chlorobenzylidene)-3-chloro-1H-isoindole (VI: $X''' = C_6H_5$, $X'''' = Cl$, $Z = Z' = H$) (0.7 g., m.p. 126°–128°C.).

B. A mixture of 1-($\alpha$-chlorobenzylidene)-3-chloro-1H-isoindole (32.8 g.), $\beta$-(dimethylamino)ethylamine (21.1 g.) and ether (350 ml.) was stirred at room temperature (for 1.5 hr.) and filtered. Evaporation of the ether from the filtrate gave a viscous oil (40.1 g.), an ethereal solution of which was treated with hydrochloric acid. Two recrystallizations of the resulting solid (34.0 g., m.p. 159°–160°C.) from isopropyl alcohol afforded 1-($\alpha$-chlorobenzylidene)-3-{[2-dimethylamino)-ethyl]amino}-1H-isoindole (I: $X + X' = CClC_6H_5$, $Y = NQ''Q'$, $Q'' = CH_2CH_2N(CH_3)_2$, $Q' = Z = Z' = H$) dihydrochloride (12.0 g., m.p. 272°–273°C. with decomposition).

EXAMPLE 11

By substituting thionyl bromide for thionyl chloride in Step A of Example 10 and carrying the resulting 1-($\alpha$-bromobenzylidene)-3-bromo-1H-isoindole through Step B, 1-°$\alpha$-bromobenzylidene)-3-{[2-(dimethylamino)-ethyl]amino}-1H-isoindole (I: $X + X' = CBrC_6H_5$, $Y = NQ''Q'$, $Q = CH_2CH_2N(CH_3)_2$, $Q' = Z = Z' = H$) dihydrochloride is obtained.

EXAMPLE 12

A mixture of 1-benzylidene-3-ethoxy-1H-isoindole (20.0 g.) and piperidine (40 ml.) was heated under reflux (for 14 hr.). The resulting mixture was digested with methanol and filtered. Recrystallization of the solid (18.3 g., m.p. 145°–147°C.) from Skellysolve B afforded 1-benzylidene-3-piperidino-1H-isoindole (I: $X + X' = CHC_6H_5$, $Y = NQ''Q' = \overline{N(CH_2)_4CH_2}$, $Z = Z' = H$) (16.5 g., m.p. 145°–147°C.).

EXAMPLE 13

A mixture of 1-($\alpha$-chlorobenzylidene)-3-chloro-1H-isoindole (22 g.), piperidine (13.6 g.) and ether (400 ml.) was stirred at room temperature (for 3 hr.). The mixture was filtered. The filtrate was dried and concentrated. Crystallization of the residue from Skellysolve A gave 1-($\alpha$-chlorobenzylidene)-3-piperidino-1H-isoindole (I: $X + X' = CClC_6H_5$, $Y = NQ''Q' = \overline{N(CH_2)_4CH_2}$, $Z = Z' = H$) (17.6 g., m.p. 62°–63°C.).

EXAMPLE 14

A mixture of 1-benzylidene-3-ethoxy-1H-isoindole (50 g.), ammonium chloride (20 g.) and methanol (1000 ml.) was heated under reflux (for 2.5 da.). Evaporation of the methanol and recrystallization of the residue, first from ethanol and then from isopropyl alcohol, gave 1-benzylidene-3-amino-1H-isoindole (I: $X + X' = CHC_6H_5$, $Y = NQ''Q'$, $Q'' = Q' = Z = Z' = H$) hydrochloride (12.0 g., m.p. 256°–257°C. with decomposition).

EXAMPLE 15

Condensation of 1-benzylidene-3-ethoxy-1H-isoindole and methylammonium chloride affords 1-benzylidene-3-(methylamino)-1H-isoindole (I: $X + X' = CHC_6H_5$, $Y = NQ''Q'$, $Q'' = CH_3$, $Q' = Z = Z' = H$) hydrochloride.

EXAMPLE 16

Condensation of 1-benzylidene-3-ethoxy-1H-isoindole and isopropylammonium chloride affords 1-benzylidene-3-(isopropylamino)-1H-isoindole (I: $X + X' = CHC_6H_5$, $Y = NQ''Q'$, $Q'' = CH(CH_3)_2$, $Q' = Z = Z' = H$) hydrochloride.

EXAMPLE 17

Condensation of 1-benzylidene-3-ethoxy-1H-isoindole and pentylammonium chloride affords 1-benzylidene-3-(pentylamino)-1H-isoindole (I: $X + X' = CHC_6H_5$, $Y = NQ''Q'$, $Q'' = (CH_2)_4CH_3$, $Q' = Z = Z' = H$) hydrochloride.

EXAMPLE 18

A mixture of 3-ethoxy-1H-isoindole (16 g.) and benzylamine (15 g.) was heated (130°–135°C. for 1½ hr.). The excess benzylamine was distilled under vacuum. Recrystallization of the crystalline residue from Skellysolve B gave 3-(benzylamino)-1H-isoindole (I: $X = X' = Z = Z' = H$, $Y = NQQ'$, $Q = CH_2C_6H_5$, $Q' = H$) (11.0 g., m.p. 104°–105°C.).

EXAMPLE 19

Condensation of 3-ethoxy-1H-isoindole and 3-phenylpropylamine affords 3-(3-phenylpropylamino)-1H-isoindole (I: $X = X' = Z = Z' = H$, $Y = NQQ'$, $Q = (CH_2)_3C_6H_5$, $Q' = H$).

EXAMPLE 20

Condensation of 3-ethoxy-1H-isoindole and p-chlorobenzylamine affords 3-(p-chlorobenzylamino)-1H-isoindole (I: $X = X' = Z = Z' = H$, $Y = NQQ'$, $Q = CH_2C_6H_4Cl$-p, $Q' = H$).

EXAMPLE 21

Condensation of 3-ethoxy-1H-isoindole and p-hydroxybenzylamine affords 3-(p-hydroxybenzylamino)-1H-isoindole (I: $X = X' = Z = Z' = H$, $Y = NQQ'$, $Q = CH_2C_6H_4OH$-p, $Q' = H$).

EXAMPLE 22

Condensation of 3-ethoxy-1H-isoindole and p-methoxybenzylamine affords 3-(p-methoxybenzylamino)-1H-isoindole (I: $X = X' = Z = Z' = H$, $Y = NQQ'$, $Q = CH_2C_6H_4OCH_3$-p, $Q' = H$).

EXAMPLE 23

A mixture of 3-ethoxy-1H-isoindole (9.0 g.), 3,4,5-trimethoxybenzylamine hydrochloride (13.0 g.) and methanol (150 ml.) was heated under reflux (for 5 hr.) under nitrogen. The mixture was stripped of solvent. Recrystallization of the residue (14.3 g., m.p. 227°–228°C.) from isopropyl alcohol gave 3-[(3,4,5-trimethoxybenzyl)amino]-1H-isoindole (I: $X = X' = Z = Z' = H$, $Y = NQQ'$, $Q = CH_2C_6H_2(OCH_3)_3$-3,4,5, $Q' = H$) hydrochloride (8.1 g., m.p. 227°–228°C.).

EXAMPLE 24

Condensation of 3-ethoxy-1H-isoindole and p-(benzyloxy)benzylamine hydrochloride affords 3-[p-(benzyloxy)benzylamino]-1H-isoindole (I: $X = X' = Z = Z' = H$, $Y = NQQ'$, $Q = CH_2C_6H_4OCH_2C_6H_5$-p, $Q' = H$) hydrochloride.

EXAMPLE 25

Condensation of 3-ethoxy-1H-isoindole and p-(methylthio)benzylamine hydrochloride affords 3-[p-(methylthio)benzylamino]-1H-isoindole (I: X = X' = Z = Z' = H, Y = NQQ', Q = $CH_2C_6H_4SCH_3$-p, Q' = H) hydrochloride.

EXAMPLE 26

Condensation of 3-ethoxy-1H-isoindole and p-(dimethylamino)benzylamine hydrochloride affords 3-[p-(dimethylamino)-benzyl]-1H-isoindole (I: X = X' = Z = Z' = H, Y = NQQ', Q' = $CH_2C_6H_4N(CH_3)_2$-p, Q' = H) hydrochloride.

EXAMPLE 27

A mixture of 3-ethoxy-1H-isoindole (8.0 g.) and p-[2-(diethylamino)ethoxy]benzylamine (22.4 g.) was heated (80°C. for 2 hr.). The excess amine was distilled under vacuum. A Skellysolve B solution of the residue was treated with charcoal, dried and filtered. Ethereal hydrochloric acid was added to the filtrate. The solid was digested with, then recrystallized from, isopropyl alcohol, affording 3-{p-[2-(diethylamino)ethoxy]benzylamino}-1H-isoindole (I:X = X'=Z = Z' = H, Y = NQQ', Q = $CH_2C_6H_4OCH_2CH_2N(C_2H_5)_2$-p, Q' = H) dihydrochloride hydrate (11.0 g., m.p. 250°– °C.).

EXAMPLE 28

Condensation of 3-ethoxy-1H-isoindole and p-nitrobenzylamine affords 3-(p-nitrobenzylamino)-1H-isoindole (I: X = X' = Z = Z' = H, Y = NQQ', Q = $CH_2C_6H_4NO_2$-p, Q' = H).

EXAMPLE 29

Condensation of 3-ethoxy-1H-isoindole and p-sulfamoylbenzylamine affords 3-(p-sulfamoylbenzylamino)-1H-isoindole (I: X = X' = Z = Z' = H, Y = NQQ', Q = $CH_2C_6H_4SO_2NH_2$-p, Q' = H).

EXAMPLE 30

In a manner similar to that of Example 9, condensation of 1-benzylidene-3-ethoxy-1H-isoindole (24.9 g.) and β-(diethylamino)ethylamine (30 ml.) and treatment of the resulting product with hydrochloric acid afforded 1-benzylidene-3-{[2-(diethylamino)ethyl]amino}-1H-isoindole (I: X+X' = $CHC_6H_5$, Y = NQ''Q', Q'' = $CH_2CH_2N(C_2H_5)_2$, Q' = Z = Z' = H) dihydrochloride (18.1 g., m.p. 202°–204°C. with decomposition).

EXAMPLE 31

Condensation of 1-benzylidene-3-ethoxy-1H-isoindole and dimethylammonium chloride affords 1-benzylidene-3-(dimethylamino)-1H-isoindole (I: X+X' = $CHC_6H_5$, Y = NQ''Q', Q'' = Q' = $CH_3$, Z = Z' = H) hydrochloride.

EXAMPLE 32

Condensation of 1-benzylidene-3-ethoxy-1H-isoindole and dibutylammonium chloride affords 1-benzylidene-3-(dibutylamino)-1H-isoindole (I: X+X' = $CHC_6H_5$, Y = NQ''Q', Q'' = Q' = $(CH_2)_3CH_3$, Z = Z' = H) hydrochloride.

EXAMPLE 33

A mixture of 1-benzylidene-3-ethoxy-1H-isoindole (24.9 g.) and pyrrolidine (40 ml.) was heated at reflux overnight. The resulting solid was washed with ether, affording 1-benzylidene-3-(1-pyrrolidinyl)-1H-isoindole (I: X+X' = $CHC_6H_5$, Y = NQ''Q', Q''+Q' = $N(CH_2)_3CH_2$, Z = Z' = H) (19.7 g., m.p. 212°–213°C.).

EXAMPLE 34

A mixture of 3-ethoxy-1H-isoindole (22.1 g.), hydrazine (97%, 17.8 g.) and absolute ethanol (160 ml.) was heated under reflux (for 2.5 hr.). The mixture was stripped of ethanol and excess hydrazine and the residue was triturated with Skellysolve A. The resulting solid (17.5 g., m.p. 139°–141°C.) was recrystallized from acetonitrile, affording 3-hydrazino-1H-isoindole (I: X = X' = Z = Z' = H, Y = NQQ', Q = $NH_2$, Q' = H) (13.0 g., m.p. 145°–146°C. with decomposition).

EXAMPLE 35

Condensation of 1-methyl-3-ethoxy-1H-isoindole and hydrazine affords 1-methyl-3-hydrazino-1H-isoindole (I: X = $CH_3$, X' = Z = Z' = H, Y = NQQ', Q = $NH_2$, Q' = H).

EXAMPLE 36

Condensation of 1-butyl-3-ethoxy-1H-isoindole and hydrazine affords 1-butyl-3-hydrazino-1H-isoindole (I: X = $(CH_2)_3CH_3$, X' = Z = Z' = H, Y = NQQ', Q = $NH_2$, Q' = H).

EXAMPLE 37

Condensation of 1-phenyl-3-ethoxy-1H-isoindole and hydrazine affords 1-phenyl-3-hydrazino-1H-isoindole (I: X = $C_6H_5$, X' = Z = Z' = H, Y = NQQ', Q = $NH_2$, Q' = H).

EXAMPLE 38

Condensation of 1-benzyl-3-ethoxy-1H-isoindole and hydrazine affords 1-benzyl-3-hydrazino-1H-isoindole (I: X = $C_6H_5CH_2$, X' = Z = Z' = H, Y = NQQ', Q = $NH_2$, Q' = H).

EXAMPLE 39

Condensation of 3-ethoxy-6-methyl-1H-isoindole (III: X'' = X' = Z = H, Q''' = $C_2H_5$, Z' = $CH_3$) and hydrazine affords 3-hydrazino-6-methyl-1H-isoindole (I: X = X' = Z = H, Y = NQQ', Q = $NH_2$, Q' = H, Z' = $CH_3$).

EXAMPLE 40

Condensation of 3-ethoxy-5-chloro-1H-isoindole (III: X'' = X' = Z' = H, Q''' = $C_2H_5$, Z = Cl) and hydrazine affords 3-hydrazino-5-chloro-1H-isoindole (I: X = X' = Z' = H, Y = NQQ', Q = $NH_2$, Q' = H, Z = Cl).

EXAMPLE 41

Condensation of 3-ethoxy-5-hydroxy-1H-isoindole (III: X'' = X' = Z' = H, Q''' = $C_2H_5$, Z = HO) and hydrazine affords 3-hydrazino-5-hydroxy-1H-isoindole (I: X = X' = Z' = H, Y = NQQ', Q = $NH_2$, Q' = H, Z = HO).

EXAMPLE 42

Condensation of 3-ethoxy-5-methoxy-1H-isoindole (III: X'' = X' = Z' = H, Q''' = $C_2H_5$, Z = $CH_3O$) and hydrazine affords 3-hydrazino-5-methoxy-1H-isoindole (I: X = X' = Z' = H, Y = NQQ', Q = $NH_2$, Q' = H, Z = $CH_3O$).

EXAMPLE 43

Condensation of 3-ethoxy-5,6-dimethoxy-1H-isoindole (III: X'' = X' = H, Q''' = $C_2H_5$, Z = Z' = $CH_3O$) and hydrazine affords 3-hydrazino-5,6-dimethoxy-1H-isoindole (I: X = X' = H, Y = NQQ', Q = $NH_2$, Q' = H, Z = Z' = $CH_3O$).

EXAMPLE 44

Condensation of 3-ethoxy-5,6-methylenedioxy-1H-isoindole (III: X'' = X' = H, Q''' = $C_2H_5$, Z+Z' = $OCH_2O$) and hydrazine affords 3-hydrazino-5,6-methylenedioxy-1H-isoindole (I: X = X' = H, Y = NQQ', Q = $NH_2$, Q' = H, Z+Z' = $OCH_2O$).

EXAMPLE 45

In a manner similar to that of Example 59, condensation of 1-benzylidene-3-ethoxy-1H-isoindole (24.9 g.) and hydrazine (95%, 14.2 g.) gave a solid (18.7 g., m.p. 117°–120°C.), which was recrystallized from benzene, affording 1-benzylidene-3-hydrazino-1H-isoindole (I: X+X' = $CHC_6H_5$, Y = NQQ', Q = $NH_2$, Q' = Z = Z' = H) (9.0 g., m.p. 175°–176°C.).

EXAMPLE 46

Condensation of 3-ethoxy-1H-isoindole and hydroxylamine hydrochloride affords 3-hydroxylamino-1H-isoindole (I: X = X' = Z = Z' = H, Y = NQQ', Q = OH, Q' = H) hydrochloride.

EXAMPLE 47

Condensation of 3-hydrazino-1H-isoindole and formaldehyde affords 3-(2-methylenehydrazino)-1H-isoindole (I: X = X' = Z = Z' = H, Y = NHN=CRR', R = R' = H).

EXAMPLE 48

Condensation of 3-hydrazino-1H-isoindole and acetaldehyde affords 3-(2-ethylidenehydrazino)-1H-isoindole (I: X = X' = Z = Z' = H, Y = NHN=CRR', R = $CH_3$, R' = H).

EXAMPLE 49

Condensation of 3-hydrazino-1H-isoindole and isobutyraldehyde affords 3-(2-isobutylidenehydrazino)-1H-isoindole (I: X = X' = Z = Z' = H, Y = NHN=CRR', R = $CH(CH_3)_2$, R' = H).

EXAMPLE 50

Condensation of 3-hydrazino-1H-isoindole and pivaldehyde affords 3-[2-(tert-butylmethylene)hydrazino]-1H-isoindole (I: X = X' = Z = Z' = H, Y = NHN=CRR', R = $C(CH_3)_3$, R' = H).

EXAMPLE 51

Condensation of 3-hydrazino-1H-isoindole and tiglaldehyde affords 3-[2-(2,3-dimethylallylidene)hydrazino]-1H-isoindole (I: X = X' = Z = Z' = H, Y = NHN=CRR, R = $C(CH_3)$=$CHCH_3$, R' = H).

EXAMPLE 52

Condensation of 3-hydrazino-1H-isoindole and cyclopentanecarboxaldehyde affords 3-[2-(cyclopentylmethylene)-hydrazino]-1H-isoindole (I: X = X' = Z = Z' = H, Y = NHN=CRR', R = $\overline{CH(CH_2)_3CH_2}$, R' = H).

EXAMPLE 53

Condensation of 3-hydrazino-1H-isoindole and 3-cyclohexenecarboxaldehyde affords 3-[2-(cyclohexenylmethylene)hydrazino]-1H-isoindole (I: X = X' = Z = Z' = H, Y = NHN=CRR', R = $\overline{CHCH_2CH=CHCH_2CH_2}$, R' = H).

EXAMPLE 54

Condensation of 3-hydrazino-1H-isoindole and benzaldehyde affords 3-(2-benzylidenehydrazino)-1H-isoindole (I: X = X' = Z = Z' = H, Y = NHN=CRR', R = $C_6H_5$, R' = H).

EXAMPLE 55

Condensation of 3-hydrazino-1H-isoindole and α-phenylpropionaldehyde affords 3-[2-(2-phenylpropenylidene)hydrazino]-1H-isoindole (I: X = X' = Z = Z' = H, Y = NHN=CRR', R = $CH(CH_3)$-$C_6H_5$, R' = H).

EXAMPLE 56

A mixture of 3-hydrazino-1H-isoindole (8.5 g.) and α-methylcinnamaldehyde (8.7 g.) in ether (300 ml.) was stirred overnight at room temperature, dried over magnesium sulfate and acidified with ethereal hydrogen chloride. Two recrystallizations of the resulting solid (18.5 g., m.p. 215°–217°C.) from methanol afforded 3-[2-(2-methyl-3-phenylallylidene)-hydrazino]-1H-isoindole (I: X = X' = Z = Z' = H, Y = NHN=CRR', R = $C(CH_3)$=$CHC_6H_5$, R' = H) hydrochloride monohydrate (11.0 g., m.p. 220°–222°C.).

EXAMPLE 57

Condensation of 3-hydrazino-1H-isoindole and p-bromobenzaldehyde affords 3-[2(p-bromobenzylidene)hydrazino]-1H-isoindole (I: X = X' = Z = Z' = H, Y = NHN=CRR', R = $C_6H_4Br$-p, R' = H).

EXAMPLE 58

Condensation of 3-hydrazino-1H-isoindole and m-hydroxybenzaldehyde affords 3-[2-(m-hydroxybenzylidene)hydrazino]-1H-isoindole (I: X = X' = Z = Z' = H, Y = NHN=CRR', R = $C_6H_4OH$-m, R' = H).

EXAMPLE 59

Condensation of 3-hydrazino-1H-isoindole and p-tolualdehyde affords 3-[2-(p-methylbenzylidene)hydrazino]-1H-isoindole (I: X = X' = Z = Z' = H, Y = NHN=CRR', R = $C_6H_4CH_3$-p, R' = H).

EXAMPLE 60

Condensation of 3-hydrazino-1H-isoindole and syringaldehyde affords 3-[2-(3,5-dimethoxy-4-hydroxybenzylidene)hydrazino]-1H-isoindole (I: X = X' = Z = Z' = H, Y = NHN=CRR', R = $C_6H_2OH$-4-$(OCH_3)_2$-3,5, R' = H).

EXAMPLE 61

Condensation of 3-hydrazino-1H-isoindole and p-(ethylthio)benzaldehyde affords 3-{2-[p-(ethylthio)-benzylidene]hydrazino}-1H-isoindole (I: X = X' = Z = Z' = H, Y = NHN=CRR, R = $C_6H_4SC_2H_5$-p, R' = H).

EXAMPLE 62

Condensation of 3-hydrazino-1H-isoindole and p-(dimethylamino)benzaldehyde affords 3-{2-[p-(dimethylamino)benzylidene]-hydrazino}-1H-isoindole (I: X = X' = Z = Z' = H, Y = NHN=CRR', R = $C_6H_4N(CH_3)_2$-p, R' = H).

EXAMPLE 63

Condensation of 3-hydrazino-1H-isoindole and p-[2-(diethylamino)ethoxy]benzaldehyde affords 3-<2-{p-[2-(diethylamino)ethoxy]benzylidene}hydrazino>-1H-isoindole (I: X = X' = Z = Z' = H, Y = NHN=CRR', R = $C_6H_4OCH_2CH_2N(C_2H_5)_2$-p, R' = H).

EXAMPLE 64

Condensation of 3-hydrazino-1H-isoindole and p-nitrobenzaldehyde affords 3-[2-(p-nitrobenzylidene)-hydrazino]-1H-isoindole (I: X = X' = Z = Z' = H, Y = NHN=CRR', R = $C_6H_4NO_2$-p, R' = H).

EXAMPLE 65

Condensation of 3-hydrazino-1H-isoindole and p-sulfamoylbenzaldehyde affords 3-[2-(p-sulfamoylbenzylidene)-hydrazino]-1H-isoindole (I: X = X' = Z = Z' = H, Y = NHN=CRR', R = $C_6H_4SO_2NH_2$-p, R' = H).

EXAMPLE 66

A mixture of 3-hydrazino-1H-isoindole (15 g.), acetone (530 ml.) and sulfuric acid (10 g.) was stirred (for 1 hr. at 15°C.). The resulting solid was collected by filtration, washed with ether and dried, affording 3-(2-isopropylidenehydrazino)-1H-isoindole (I: X = X' = Z = Z' = H, Y = NHN=CRR', R = R' = $CH_3$) sulfate (19.5 g., m.p. 138°–140°C.).

EXAMPLE 67

Condensation of 3-hydrazino-1H-isoindole and methyl isopropyl ketone affords 3-[2-(1,2-dimethylpropylidene)hydrazino]-1H-isoindole (I: X = X' = Z = Z' = H, Y = NHN=CRR', R = $CH_3$, R' = $CH(CH_3)_2$).

EXAMPLE 68

Condensation of 3-hydrazino-1H-isoindole and cyclohexanone affords 3-(2-cyclohexylidenehydrazino)-1H-isoindole (I: X = X' = Z = Z' = H, Y = NHN=CRR', R+R' = $\overline{C(CH_2)_4CH_2}$).

EXAMPLE 69

Condensation of 1-methyl-3-hydrazino-1H-isoindole and acetone affords 1-methyl-3-(2-isopropylidenehydrazino)-1H-isoindole (I: X = $CH_3$, X' = Z = Z' = H, Y = NHN=CRR', R = R' = $CH_3$).

EXAMPLE 70

Condensation of 1-butyl-3-hydrazino-1H-isoindole and acetone affords 1-butyl-3-(2-isorpopylidenehydrazino)-1H-isoindole (I: X = $(CH_2)_3CH_3$, X' = Z = Z' = H, Y = NHN=CRR', R = R' = $CH_3$).

EXAMPLE 71

Condensation of 1-phenyl-3-hydrazino-1H-isoindole and acetone affords 1-phenyl-3-(2-isopropylidenehydrazino)-1H-isoindole (I: X = $C_6H_5$, X' = Z = Z' = H, Y = NHN=CRR', R = R' = $CH_3$).

EXAMPLE 72

Condensation of 1-benzyl-3-hydrazino-1H-isoindole and acetone affords 1-benzyl-3-(2-isopropylidenehydrazino)-1H-isoindole (I: X = $C_6H_5CH_2$, X' = Z = Z' = H, Y = NHN=CRR', R = R' = $CH_3$).

EXAMPLE 73

Condensation of 3-hydrazino-6-methyl-1H-isoindole and acetone affords 3-(2-isopropylidenehydrazino)-5-methyl-1H-isoindole (I: X = X' = Z' = H, Y = NHN=CRR', R = R' = Z = $CH_3$).

EXAMPLE 74

Condensation of 3-hydrazino-5-chloro-1H-isoindole and acetone affords 3-(2-isopropylidenehydrazino)-6-chloro-1H-isoindole (I: X = X' = Z = H, Y = NHN=CRR', R = R' = $CH_3$, Z' = Cl).

EXAMPLE 75

Condensation of 3-hydrazino-5-hydroxy-1H-isoindole and acetone affords 3-(2-isopropylidenehydrazino)-6-hydroxy-1H-isoindole (I: X = X' = Z = H, Y = NHN=CRR', R = R' = $CH_3$, Z' = HO).

EXAMPLE 76

Condensation of 3-hydrazino-5-methoxy-1H-isoindole and acetone affords 3-(2-isopropylidenehydrazino)-6-methoxy-1H-isoindole (I: X = X' = Z = H, Y = NHN=CRR', R = R' = $CH_3$, Z' = $CH_3O$).

EXAMPLE 77

Condensation of 3-hydrazino-5,6-dimethoxy-1H-isoindole and acetone affords 3-(2-isopropylidenehydrazino)-5,6-dimethoxy-1H-isoindole (I: X = X' = H, Y = NHN=CRR', R = R' = $CH_3$, Z = Z' = $CH_3O$).

EXAMPLE 78

Condensation of 3-hydrazino-5,6-methylenedioxy-1H-isoindole and acetone affords 3-(2-isopropylidenehydrazino)-5,6-methylenedioxy-1H-isoindole (I: X = X' = H, Y = NHN=CRR', R = R' = $CH_3$, Z+Z' = $OCH_2O$).

EXAMPLE 79

A mixture of 1-benzyl-3-ethoxy-1H-isoindole (16 g.) and β-(diethylamino)ethylamine (20 ml.) was heated (80°C., 2 hr.), then stripped of volatile components under vacuum. Treatment of part (19.2 g.) of the resulting crude oil (21.2 g.) with cyclohexanesulfamic acid (N/2 in isopropyl alcohol, 260 ml.) and recrystallization of the resulting solid from isopropyl alcohol afforded 1-benzyl-3-{[2-(diethylamino)ethyl]-amino}-1 H-isoindole (I: X=$CH_2C_6H_5$, X'=z=z'=H, Y= NQQ', Q = $CH_2CH_2N(CH_2CH_3)_2$, Q' = H) bis(cyclohexanesulfamate) (9.5 g., m.p. 159°–160°C.).

EXAMPLE 80

In a manner similar to that of Example 56, condensation of 3-hydrazino-1H-isoindole (14.7 g.) and trans-cinnamaldehyde (13.8 g.) and treatment of the resulting product with hydrogen chloride afforded 3-[2-(3-phenylallylidene)hydrazino]-1H-isoindole (I: X = X' = Z = Z' = H, Y = NHN=CRR', R = CH = $CHC_6H_5$, R' = H) hydrochloride (16.0 g., m.p. 212°–214°C. with decomposition).

I claim:
1. 1-(X)-1-(X')-3-(Y)-5-(Z)-6-(Z')-1H-Isoindole of the formula

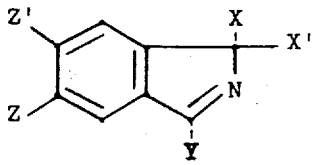

wherein:
- X is hydrogen or atertiary alkyl of one to four carbon atoms;
- X' is hydrogen;
- Y is NQQ' or NHN=CRR';

wherein:
- Q is amino or hydroxy;
- Q' is hydrogen or atertiary alkyl of one to four carbon atoms;
- R, when taken alone, is hydrogen, alkyl of one to six carbon atoms, alkenyl of two to six carbon atoms, cycloalkyl of three to seven ring atoms and three to ten carbon atoms, cycloalkenyl of five to seven ring atoms and five to ten carbon atoms, phenyl, phenylalkyl of seven to ten carbon atoms or phenylalkenyl of eight to twelve carbon atoms;
- R', when taken alone, is hydrogen or atertiary alkyl of one to four carbon atoms; or
- R and R', when taken together with C, are cycloalkylidene of five to seven ring atoms and five to ten carbon atoms;
- Z and Z', when taken alone, are the same or different and are hydrogen, atertiary alkyl of one to four carbon atoms, halo, hydroxy or atertiary alkoxy of one to four carbon atoms; or
- Z and Z', when taken together, are methylenedioxy; and wherein,
- when R is phenyl, phenylalkyl or phenylalkenyl, the benzene ring thereof can be substituted by one to three members selected from the group consisting of halo, hydroxy, atertiary alkyl of one to four carbon atoms, atertiary alkoxy of one to four carbon atoms and phenylalkoxy of seven to ten carbon atoms or by a member selected from the group consisting of atertiary alkylthio of one to four carbon atoms, dialkylamino and β-dialkylaminoethoxy, wherein alkyl of dialkylamino is atertiary alkyl of one to four carbon atoms, nitro and sulfamoyl; or an acid addition salt thereof.

2. 1-(X)-1-(X')-3-(Y)-5-(Z)-6-(Z')-1H-Isoindole wherein Y is NQQ' and Q is amino or an acid addition salt thereof according to claim 1.

3. 1-(X)-1-(X')-3-(Y)-5-(Z)-6-(Z')-1H-Isoindole wherein Z and Z' are each hydrogen or an acid addition salt thereof according to claim 2.

4. 3-Hydrazino-1H-isoindole or an acid addition salt thereof according to claim 3.

5. 1-(X)-1-(X')-3-(Y)-5-(Z)-6-(Z')-1H-Isoindole wherein Y is NHN=CRR' or an acid addition salt thereof according to claim 1.

6. 1-(X)-1-(X')-3-(Y)-5-(Z)-6-(Z')-1H-Isoindole wherein Z and Z' are each hydrogen or an acid addition salt thereof according to claim 5.

7. 3-[2-(3-Phenylallylidene)hydrazino]-1H-isoindole or an acid addition salt thereof according to claim 6.

8. 3-[2-(2-Methyl-3-phenylallylidene)hydrazino]-1H-isoindole or an acid addition salt thereof according to claim 6.

9. 3-(2-Isopropylidenehydrazino)-1H-isoindole or an acid addition salt thereof according to claim 6.

* * * * *